United States Patent
Swanson et al.

(10) Patent No.: US 8,319,797 B2
(45) Date of Patent: *Nov. 27, 2012

(54) METHOD AND APPARATUS FOR BACKGROUND REPLACEMENT IN STILL PHOTOGRAPHS

(75) Inventors: Richard Lee Swanson, Hopkins, MN (US); Earl John Adolphi, Los Lunas, NM (US); Michael John Surma, Eagan, MN (US); John Robert Reinert Nash, Prior Lake, MN (US)

(73) Assignee: Lifetouch Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,899

(22) Filed: Jan. 26, 2012

(65) Prior Publication Data

US 2012/0120281 A1    May 17, 2012

Related U.S. Application Data

(63) Continuation of application No. 12/897,305, filed on Oct. 4, 2010, now Pat. No. 8,134,576, which is a continuation of application No. 11/732,507, filed on Apr. 3, 2007, now Pat. No. 7,834,894.

(51) Int. Cl.
G09G 5/00 (2006.01)
H04N 5/225 (2006.01)
(52) U.S. Cl. ................... 345/634; 348/207.99
(58) Field of Classification Search .................. 345/634; 348/207.99
See application file for complete search history.

(56) References Cited

U.S. PATENT DOCUMENTS

| | | | |
|---|---|---|---|
| 1,673,019 A | 6/1928 | Pomeroy |
| 2,323,754 A | 6/1943 | Oliver |
| 2,580,422 A | 1/1952 | Gunn |
| 2,663,217 A | 12/1953 | Tuttle et al. |
| 3,322,487 A | 5/1967 | Renner |
| 4,067,026 A | 1/1978 | Pappanikolaou |
| 4,457,599 A | 7/1984 | Sawicki |
| 5,426,317 A | 6/1995 | Hirota |
| 5,574,511 A | 11/1996 | Yang et al. |

(Continued)

FOREIGN PATENT DOCUMENTS

EP    0 512 839 A2    11/1992

(Continued)

OTHER PUBLICATIONS

Porter et al., "Compositing Digital Images." *Computer Graphics* 18;3(1984): 253-259.

(Continued)

*Primary Examiner* — Ryan R Yang
(74) *Attorney, Agent, or Firm* — Merchant & Gould P.C.

(57) ABSTRACT

A first digital image is acquired of a framed area while illuminating the background and foreground object under a first lighting condition. A second digital image is then acquired of the same framed area while illuminating the background and foreground object under a second lighting condition. Preferably, the first lighting condition illuminates the background without illuminating the foreground object so that a silhouette of the foreground object is acquired in the first image. The second lighting condition illuminates the foreground object (e.g., with frontal lights). Due to the difference in the illumination between the background and silhouette in the first image, an alpha mask can be created from the first acquired image. Using the mask, the background from the second image can be removed and replaced by virtually any other desired background image.

20 Claims, 11 Drawing Sheets

U.S. PATENT DOCUMENTS

| | | |
|---|---|---|
| 5,577,179 A | 11/1996 | Blank |
| 5,631,976 A | 5/1997 | Bolle et al. |
| 5,764,306 A | 6/1998 | Steffano |
| 5,781,198 A | 7/1998 | Korn |
| 5,831,685 A | 11/1998 | Vlahos et al. |
| 5,870,103 A | 2/1999 | Luo |
| 5,923,380 A | 7/1999 | Yang et al. |
| 5,946,500 A | 8/1999 | Oles |
| 6,288,385 B1 | 9/2001 | Miramonti et al. |
| 6,445,814 B2 | 9/2002 | Iijima et al. |
| 6,490,006 B1 | 12/2002 | Monjo |
| 6,707,940 B1 | 3/2004 | Qian |
| 6,792,140 B2 | 9/2004 | Matusik et al. |
| 6,798,897 B1 | 9/2004 | Rosenberg |
| 6,819,796 B2 | 11/2004 | Hong et al. |
| 6,856,705 B2 | 2/2005 | Perez |
| 6,885,767 B1 | 4/2005 | Howell |
| 6,909,806 B2 | 6/2005 | Li |
| 6,912,313 B2 | 6/2005 | Li |
| 6,950,130 B1 | 9/2005 | Qian |
| 7,065,242 B2 | 6/2006 | Petrov et al. |
| 7,081,898 B2 | 7/2006 | Sevigny |
| 7,084,879 B2 | 8/2006 | Sevigny |
| 2003/0035061 A1 | 2/2003 | Iwaki et al. |
| 2003/0058939 A1 | 3/2003 | Lee et al. |
| 2003/0133044 A1 | 7/2003 | Akiyama et al. |
| 2007/0200938 A1 | 8/2007 | Kaku et al. |
| 2007/0263119 A1 | 11/2007 | Shum et al. |

FOREIGN PATENT DOCUMENTS

| | | |
|---|---|---|
| JP | 59-121029 | 7/1984 |
| JP | 2005-215958 | 8/1993 |
| JP | 10-124704 | 5/1998 |
| JP | 11-073491 | 3/1999 |
| JP | 2000-224410 | 8/2000 |
| JP | 2003-058873 | 2/2003 |
| JP | 2006-279206 | 10/2006 |
| WO | WO 94/26057 | 11/1994 |
| WO | WO 97/33437 | 9/1997 |

OTHER PUBLICATIONS

Kodak KAI-11002 Image Sensor, Device Performance Specification, Revision 1.0 MTD/PS-0938, Jan. 30, 2006, 44 pages.

"Alpha Compositing." *Wikipedia*. 2007. Jan. 17, 2007 <hhttp://en.wikipedia.org/wiki/Alpha_compositing>.

"Digital compositing." *Wikipedia*. 2007. Jan. 17, 2007 <hhttp://en.wikipedia.org/wiki/Digital_compositing>.

"About: Graphics Software." About.com. Feb. 26, 2007 <http://graphicssoft.about.com/od/paintshoppro/l/blremovebackg.htm>.

"About: Graphics Software." About.com. Feb. 26, 2007 <http://graphicssoft.about.com/od/paintshoppro/l/blrbpsp_1jet.htm>.

"Kodak CCD Primer, #KCP-001, Charge-coupled device (CCD) Image Sensors." Eastman Kodak Company—Microelectronics Technology Division, Jul. 2001.

Grotta, Sally W. , "Anatomy of Digital Camera: Image Sensors." *PC Magazine*. 2001. Jan. 17, 2007.<http://www.extremetech.com/print_article2/0,1217,a=2036,00.asp>.

"Image Sensors." Extremetech.com. Ziff Davis Publishing Holdings, Inc.. Jan. 17, 2007 <http://www.extremetech.com/article2/0,1697,1157575,00.asp>.

"Image Sensors." Extremetech.com. Ziff Davis Publishing Holdings, Inc.. Jan. 1, 2007.<http://www.extremetech.com/article2/0,1697,1157576,00.asp>.

"Image Sensors." Extremetech.com. Ziff Davis Publishing Holdings, Inc.. Jan. 1, 2007 <http://www.extremetech.com/article2/0,1697,1157578,00.asp>.

Printouts of the home page of Immersion Corporation (downloaded and reproduced on Jun. 13, 2002 from the website of Immersion Corporation (http://www.immersion.com/products/3d/capture/overviews.shtml)), 6 pages.

International Search Report and Written Opinion mailed Jul. 2, 2008.

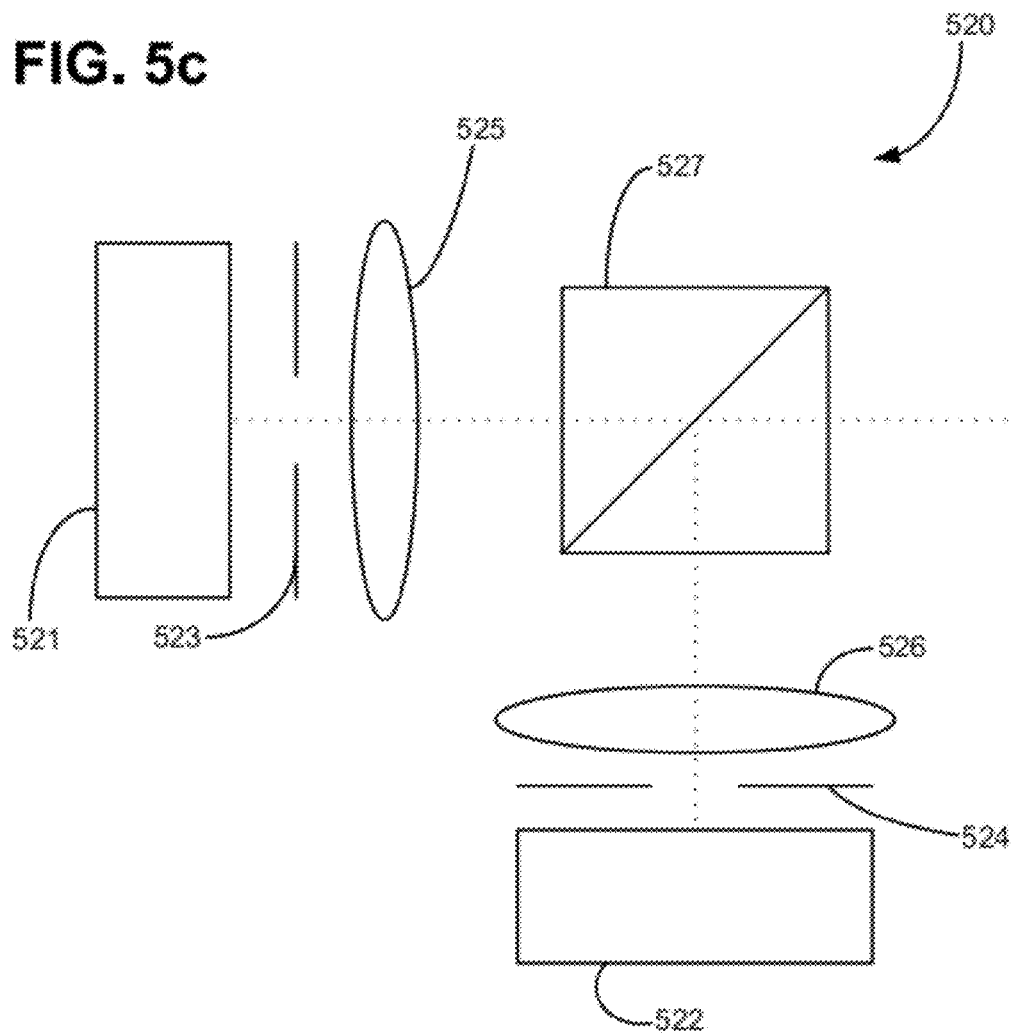

METHOD AND APPARATUS FOR BACKGROUND REPLACEMENT IN STILL PHOTOGRAPHS

CROSS REFERENCE TO RELATED APPLICATIONS

This application is a continuation of U.S. Pat. No. 8,134,576, filed on Oct. 4, 2010, issued on Mar. 13, 2012, and entitled METHOD AND APPARATUS FOR BACKGROUND REPLACEMENT IN STILL PHOTOGRAPHS, which is a continuation of U.S. Pat. No. 7,834,894, filed on Apr. 3, 2007, issued on Nov. 16, 2010, and entitled METHOD AND APPARATUS FOR BACKGROUND REPLACEMENT IN STILL PHOTOGRAPHS, the disclosures of which are hereby incorporated by reference in their entireties.

TECHNICAL FIELD

This invention relates generally to the field of photography; more particularly, to portrait and still life photography; and more particularly still to determining, removing and replacing the background in a portrait or still life photograph with a new background thereby creating a different composite image.

BACKGROUND

It is often desirable in photography to separate the background of an image from the foreground object. For example, photographic studios, professional photographers, and others performing commercial portrait work (collectively referred to herein as "photographers") often take pictures of humans and/or still life objects and are asked to deliver images of the subjects without the original background and/or with a different background. The request may be for advertising purposes, uniformity of a plurality of images (e.g., for yearbook or identification card pictures), and the like.

In the past, several methods have been employed to remove the background from the foreground subject in an image. A first prior method utilizes various tools in software packages such as Adobe Photoshop (by Adobe) and Paint Shop Pro (by Corel). These tools are often very labor intensive and generally comprise using erase functions and lasso style tools. In the former, the edge of the foreground object is located by hand, and the background is erased using the tool. In the latter, a tool finds edges automatically when the object is selected. However, the tool is often imprecise due to contrast and color issues between the foreground object and background. Therefore, these tools suffer drawbacks being labor intensive and imprecise, especially in cases where the foreground and background colors cannot be selected in advance. At least one prior art reference has termed these types of systems as brute force techniques.

Another method of determining the background using these types of software packages can be performed manually by splitting the image into the RGB channels. The image with the highest contrast between the foreground object and background can be selected, and then a mask can be created manually through a series of steps. The mask is used together with the original image to eliminate the background. However, this process suffers a drawback in that it is not automated and depends on a manual selection of a highest contrast channel and creation of the mask.

Chroma key replacement for background removal has also been performed by utilizing a monochromatic background. Typically green screens are used with human subjects in order to provide a contrast with skin colors. An automated system strips away portions of the image pixel by pixel by assessing whether the pixel has a color that lies within a preprogrammed range of colors. Several disadvantages associated with this system include inadvertently stripping away any pixels (in this example green) that are located on the foreground object of interest, stripping of border portions of the foreground object due to reflectance of the background green color onto the foreground object, and stripping of reflective objects located on the foreground object (e.g., watches, jewelry, etc.). Accordingly, chroma key replacement has a number of drawbacks when used in connection with fine photography, and especially in those instances where colors of the foreground object are not controlled and/or known in advance.

Another example of a prior system employed to eliminate backgrounds is shown in U.S. Pat. No. 6,885,767 to Howell. This system intentionally creates a background which is much brighter than the foreground object. In this manner, the differential in brightness between the foreground and background is used to discriminate between the two. The system utilizes a background with a very high degree of reflection, wherein incident light tends to reflect back along the path from which it came. A device, mounted on the front of the camera, includes a strobe, a partially silvered mirror, and a condenser lens. When the shutter opens, the light source causes intense light to impinge on the object and the reflective background. Due to the high reflectivity, the background is brighter than the foreground object. This image is then used as a mask for other shots of the object where the strobe is not triggered. Accordingly, this process uses an intensity technique, rather than a chroma technique to eliminate the background. However, this method also has several drawbacks, including the requirement of a particular reflective background and special equipment to create the desired light intensity coming from the plane of the camera lens. The method also has drawbacks if taking photographs of humans. More particularly, while the method may be suitable for photographing still life objects, if the object moves between the images, then the mask will not register properly with the image of the object in the other images.

U.S. Pat. No. 5,574,511 to Yang et al. illustrates yet another method of utilizing light intensity to create a mask. Here, two IR images with different intensities of IR illumination in the foreground and background are compared. A mask is then created which is applied to a visible light image. Here again, the method has drawbacks including requiring special equipment, such as IR illumination sources and a second camera having an IR pass filter. Further, in the case of photographing humans, movement of the subject between the shots may create a rough match for the mask. Also, the IR mask is not precise enough for fine photography.

Still another system is disclosed in published U.S. Patent Application 2003/0035061. In this system, a still life object is set on a turntable rotating at a constant velocity. A series of images are taken, in an alternating manner, with the foreground object first illuminated and then the background illuminated in a manner to create a silhouette of the foreground object. In one of the embodiments described in the publication, a background cutout unit is disclosed for combining a foreground image picture with a silhouette image to deliver a cutout image. In the cutout image, only the foreground images still appear. Accordingly, the cutout image can be combined at a later time with other background images. There are several drawbacks to the system disclosed in this publication. First, the system is employed with still life 3-D objects. Therefore, it does not take into consideration photographing objects which may move in a direction and/or manner other than the fixed rotational velocity of the turntable. Accordingly, photographing humans who may move between images is not considered. Second, the cutout mask is created with the object area cut-out. The mask is then used in a reversed mask layer subtraction process to remove the background. Also, the original image is not described as being preserved and transmitted—even though this image (and its attendant metadata) may be desired and/or used in other downstream processing.

Therefore, there is a need in the art for a method, apparatus and system which facilitates taking images of foreground objects in a manner in which the background can be determined, removed and replaced without relying on manual methods, chroma replacement, and/or other special IR cameras or equipment mounted in front of the camera to illuminate the foreground object. The invention should also overcome the drawbacks associated with foreground objects which may move and should not require special backgrounds or predetermined colors of the foreground object. Aspects of the present invention overcome these and other shortcomings of the prior art and address these needs in the art.

SUMMARY

The invention relates to a method, apparatus and system for selectively separating out a foreground object of interest from a still photograph. In a preferred embodiment constructed in accordance with the principles of the present invention, two digital images are collected. One image includes lighting that illuminates both the foreground object and the background. The other image is collected with only the background illuminated, thereby creating a silhouette of the foreground object. This latter image is used to create an accurate mask which, when registered with the image with the foreground lighting, allows for the removal of the background.

One environment in which the present invention may be employed is in connection with portrait photography. For convenience, this environment will be used in describing the embodiments set forth herein. However, it should be appreciated that other types of still photography may employ the principles of the present invention. For example, still life photography and other photographs used in connection with advertising of products, food, etc. (e.g., instances where it may be desirable and/or necessary to remove or replace the background) are other representative environments.

More specifically, the present invention provides a method, apparatus and system for isolating a substantially stationary foreground object of interest included in a captured digital image from the background in the captured digital image. Preferably, a first digital image is acquired of a framed area while illuminating the background and foreground object under a first lighting condition. A second digital image is then acquired of the same framed area while illuminating the background and foreground object under a second lighting condition. Preferably, the first lighting condition illuminates the background without illuminating the foreground object so that a silhouette of the foreground object is acquired in the first image. The second lighting condition illuminates the foreground object (e.g., with frontal lights). Due to the difference in the illumination between the background and silhouette in the first image, a mask can be created from the first acquired image. Using the mask, the background from the second image can be removed and replaced by virtually any other desired background image.

The present invention preferably accounts for contributions by the foreground object and the background to the intensity level of each pixel in the border region between the two. A mixing function or alpha mask having values between 0 and 1 at each pixel may be employed. None of the above prior-art references discloses or suggests taking into account this transition between the foreground object and background.

One feature of the present invention is that the background (e.g., a back drop which comprises the background) in the captured images may be virtually any monochromatic color or constructed of any substrate/materials (e.g., fabric, vinyl, etc.). Because the principles of the present invention utilize the illumination contrast between the two images, the background does not have to be any particular color and/or constructed of a special material. Therefore, the photographer does not have to coordinate colors in advance and/or carry a large selection of backgrounds.

Another feature of the present invention is that the foreground object can be combined into a composite shot with any number of backgrounds which are preexisting and/or taken at a later time. For example, a group of students may be photographed in front of an original background at the start of a school year. During the year, the foreground objects (e.g., the images of the students) may be removed from the original background and placed in front of a second background using the school colors and mascots for school identification cards. The photographs may also be used with the original background or with a different background for a yearbook. Later that year, individual photographs of their child may be delivered to parents, where the parents can pick different predetermined backgrounds for combination with the photograph of their child. While the predetermined backgrounds can be of virtually any location or background, representative backgrounds might include the school library, stadium, quad, or other location on campus.

Still another feature of the present invention is that the image acquisition sequence may be selected to reduce the elapsed time between the acquired images. In this case, the silhouette image is captured first and the normally illuminated foreground image is captured second. In this manner, the lighting sequence can be optimized to reduce the amount of time between the two images. For example, it will be appreciated the photographic flash lighting generally includes a fairly steep front edge and then decays. Accordingly, if the photograph of the foreground object was taken first, a relatively long delay would be necessary while waiting for the front flash illumination to decay (i.e., if the second image was acquired too quickly, the foreground object would still be illuminated and a good silhouette image would not be captured). The present invention, however, preferably takes advantage of the background flash profile by acquiring the silhouette image first, and then sequences the acquisition of the second image to the appropriate time during the decaying background light.

This manner and sequence of image acquisition reduces the time between acquisition of the images and reduces the possibility of movement of the foreground object in the interval between the capture of the images. It will be understood that movement of the foreground object between images reduces the registration of the mask of the foreground object (created from the captured silhouette image) and the normally lit image of the foreground object. Therefore, this feature is very useful when photographing young children, pets, and other objects which tend to move during photographs. Other movement of the foreground object, such as normal involuntary movement of a person being photographed, is permitted by taking the backlit and front-lit images within a minimized time interval. Alternatively, if the foreground object cannot move and/or is not likely to move in the time period between image captures, then the sequence of image captures may be reversed. In such an event, the time period between such image captures may be increased to virtually any arbitrary time period.

Therefore, according to a first aspect of the invention, there is provided a method of imaging a foreground object placed in front of a background, the method comprising: acquiring a first image of the foreground object and the background while illuminating the background under a first lighting condition relative to the object; acquiring a second image of the foreground object and the background while illuminating the background under a second lighting condition relative to the object; computing a mixing function based on a selected one of the images; and using the image that was not selected and the mixing function, computing an object image function relating to an image of the foreground object with a reduced background intensity relative to the foreground object as compared to the image that was not selected.

According to the aspect recited in the preceding paragraph, there may be provided the selected image being the first image and the step of computing a mixing function includes computing an alpha value for alpha blending for each pixel of the first image. Further, the first image may be acquired under the first lighting condition, which condition comprises illuminating the background so that it is brighter than the foreground object.

According to a second aspect of the invention, there is provided a method of computing an image, the method comprising: computing a mixing function from a first image taken of a scene having a foreground object placed in front of a background, where the background is illuminated under a first lighting condition relative to the object; accessing a second image of the foreground object and the background, where the background is illuminated under a second lighting condition relative to the object; and using the second image and the mixing function, computing an object image function relating to an image of the foreground object with a reduced background intensity relative to the foreground object as compared to the second image.

According to a third aspect of the invention, there is provided a method of imaging an object placed in front of a background, the method comprising: acquiring a first image of the foreground object and the background while illuminating the background under a first lighting condition relative to the object; acquiring a second image of the foreground object and the background while illuminating the background under a second lighting condition relative to the object within a predetermined time interval of acquiring the first image, the predetermined time interval being computed based on a maximum acceptable speed of movement of the foreground object.

According to a fourth aspect of the invention, there is provided an imaging system for imaging a scene having a foreground object placed in front of the background, comprising: a camera system adapted to acquire an image of the scene; and a lighting system configured to generate a first lighting condition, in which the background appears to the camera brighter than the foreground object, and a second lighting condition, in which both the foreground object and the background are illuminated, wherein the lighting system is arranged and configured to sequentially generate the first and second lighting conditions within a time interval computed based on a maximum acceptable movement speed of the foreground object, and the camera system is adapted to acquire a first image of the scene under the first lighting condition and a second image of the scene under the second condition.

According to a fifth aspect of the invention, there is provided a storage medium having encoded thereon computer-readable instructions that, when executed by a computer, causes the computer to: compute a mixing function from a first image taken of a scene having a foreground object placed in front of a background, where the background is illuminated under a first lighting condition relative to the object; access a second image of the foreground object and the background, where the background is illuminated under a second lighting condition relative to the object; and using the second image and the mixing function, compute an object image function relating to an image of the foreground object with a reduced background intensity relative to the foreground object as compared to the second image.

According to a sixth aspect of the invention there is provided a method for isolating a substantially stationary foreground object in a framed area from the background in the framed area using still photography, comprising: acquiring a first image of the framed area, while illuminating the background and foreground object under a first lighting condition; acquiring a second image of the framed area while illuminating the background and foreground object under a second lighting condition; determining the background from a predetermined one of the first and second acquired images; and removing the background from the other image by registering the determined background of the predetermined one image with the other image.

According to the aspect recited in the preceding paragraph, the first lighting condition may illuminate the background without illuminating the foreground object so that a silhouette of the foreground object is acquired in the first image; the predetermined image may be the first image and the other image is the second image; the second lighting condition may illuminate the foreground object with frontal lights; and the step of determining the background may include determining an alpha mask.

According to a seventh aspect of the invention, there is provided a system for isolating a substantially stationary foreground object in a framed area from the background in the framed area using still photography, comprising: a front light and a back light arranged and configured to generate a first lighting condition, in which the background appears brighter than the foreground object, and a second lighting condition, in which both the foreground object and the background are illuminated; a camera system adapted to acquire a first and second image of the framed area during the first and second lighting condition, respectively; and a processor, operatively connected to the camera system, the processor including processing means for determining an alpha mask from a predetermined one of the first and second images, the alpha mask being used to remove the background from the other of the first and second images.

The aspects are numbered in the preceding paragraphs for convenience, and not by way of limitation. Further, while the invention will be described with respect to preferred embodiment configurations, and with respect to preferred foreground objects and image acquisition sequence, it will be understood that the invention is not to be construed as limited in any manner by either such configuration, foreground objects or image acquisition sequence described herein. Instead, the principles of this invention extend to any environment in which two digital images are taken sequentially where one of the images includes a silhouette of a foreground object of interest. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

In the drawings in which like elements are identified with the same designation numeral:

FIG. 5c is a third alternative embodiment to camera 210 in which two digital image sensors are employed, wherein each digital image sensor includes a shutter and lens, and a device for sending the same image to the two sensors is employed.

DETAILED DESCRIPTION

The invention relates to methods, apparatus and systems for selectively identifying and removing the background from a digital photographic image which includes a background and a foreground object. A replacement background may then be combined with the foreground object to create a composite photograph. In particular, the invention relates to methods, apparatus and systems for sequencing two photographs, creating and using a mask for removing the original background, and creating new composite photographs.

Generally, the imaging process includes capturing a backlit image of the foreground object. The resulting backlit, or silhouette, image is used to determine a mask. A normal, front-lit image of the object, i.e., an image with both the object and background illuminated is also captured. The front-lit image and the mask are combined to create an image of the object with the background removed. As previously discussed, the images may be sequenced in certain manners in order to take advantage of lighting characteristics and other considerations. In a preferred embodiment, the silhouette image is taken first and the front-lit image is taken second. However, the principles of the present invention are not limited to that order. Accordingly, while the terms first image and second image are used herein, it should be noted that the terms first and second are used to differentiate between the two images and are not meant to imply a temporal acquisition— unless the context specifically indicates otherwise.

Figure 1C:
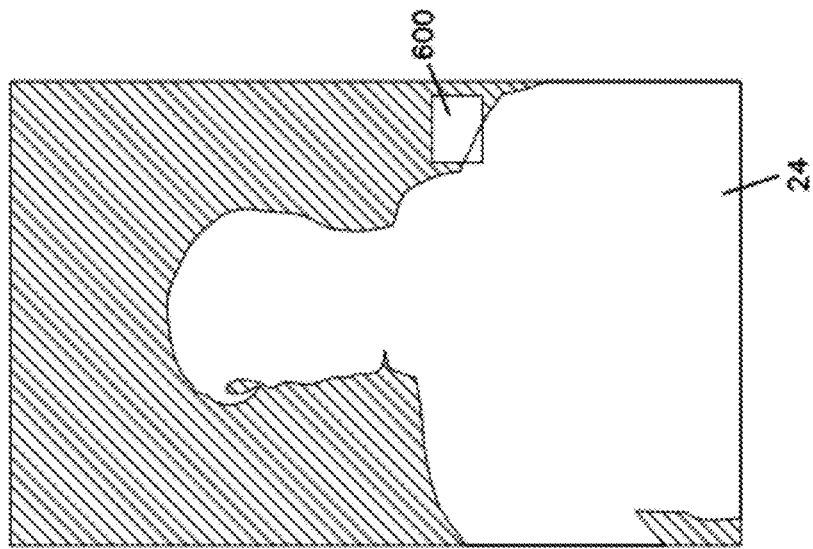
FIG. 1c illustrates a calculated a mask made from the image of FIG. 1b.
Figure 1B:
FIG. 1b illustrates a digital photographic image in which the foreground object is backlit, thereby creating a silhouette of the foreground object.
Figure 1A:
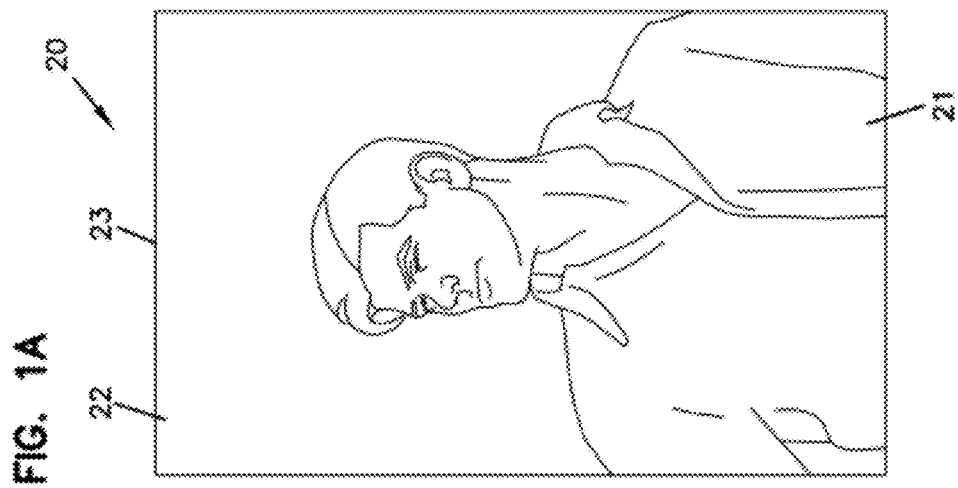
FIG. 1a illustrates a digital photographic image in which both the foreground object and the original background are illuminated.
Figure 1E:
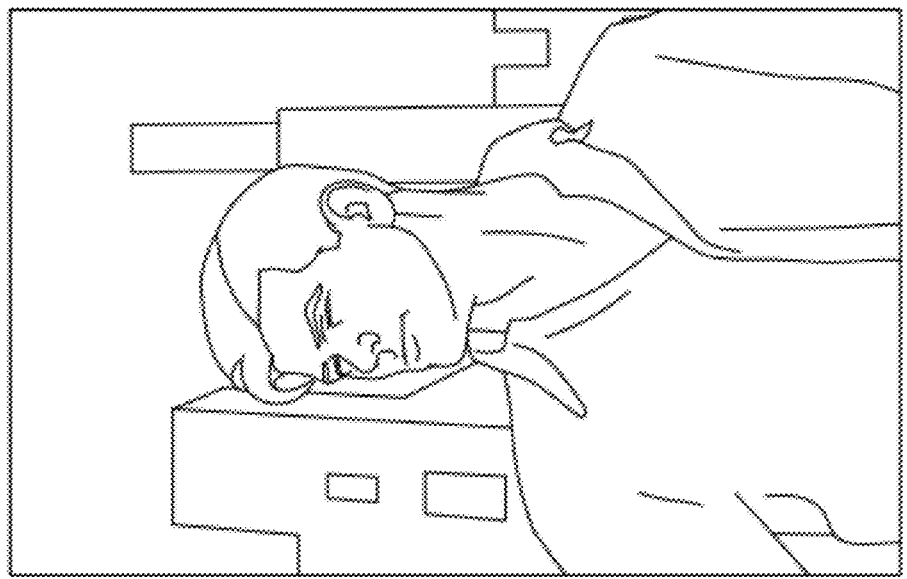
FIG. 1e illustrates a composite photograph of the foreground object of FIG. 1a in which the α mask of FIG. 1c is used to eliminate the original background and replace it with the selected background of FIG. 1d.
Figure 1D:
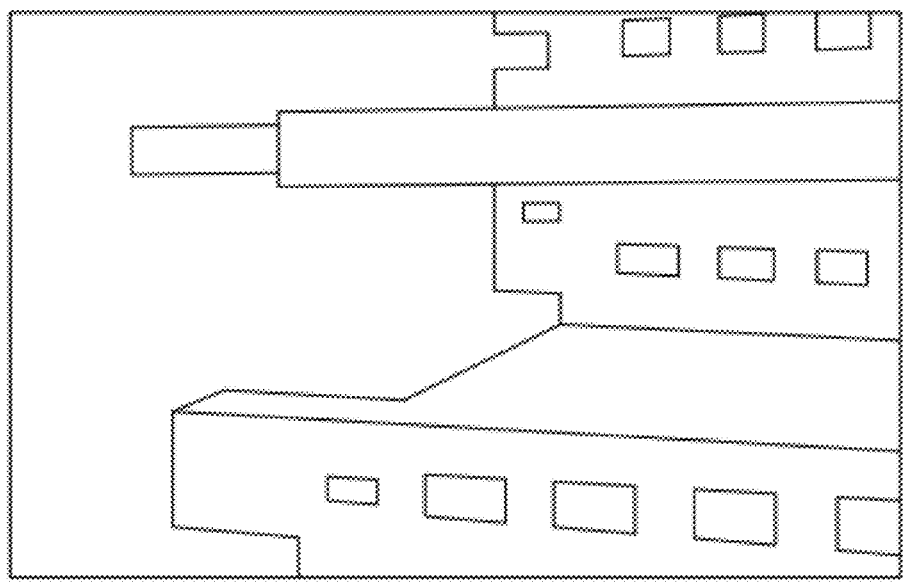
FIG. 1d illustrates a digital photograph of a selected background image.

Referring now to FIGS. 1a-1e, there is illustrated a series of images which depict an overview of the present invention. In FIG. 1a, the digital photographic image 20 includes a foreground object 21 (in this case a portrait of a person) and a background 22. In FIG. 1a, both the foreground object and the original background are illuminated in a normal manner. The framed area of the image is designated at 23. FIG. 1b illustrates a digital photographic image 20' acquired from the same camera location such that the framed area of the image remains unchanged and is designated 23. However, since the foreground object 21 was backlit, a silhouette of the foreground object 21 is created. FIG. 1c illustrates a calculated α mask 24 made from the image of FIG. 1b (described more fully below). FIG. 1d illustrates a representative digital photograph of a selected background image. Finally, FIG. 1e illustrates a composite photograph of the foreground object 21 in which the α mask 24 is used to eliminate the original background 22 and replace it with the selected background of FIG. 1d.

Figure 2:
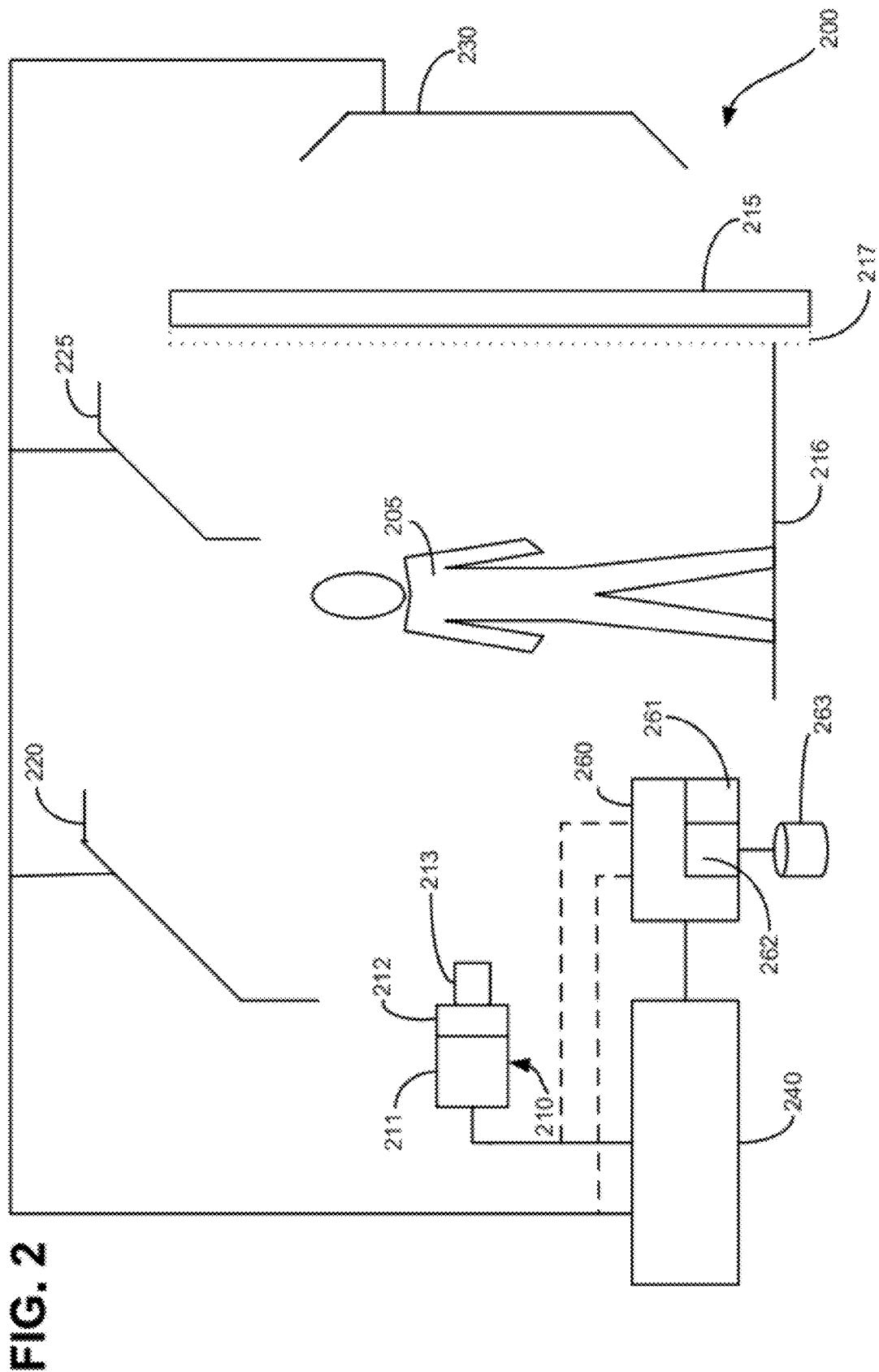
FIG. 2 schematically shows an embodiment of a system according to one aspect the invention for acquiring the normally lit and silhouette images.

Turning now to FIG. 2, a system 200 is illustrated which may be utilized in connection with the acquisition of the sequential images. A digital camera 210 is used to acquire images of a foreground object or person 205 located in front of a background 215. While preferably the background 215 is selected to provide a useful, high quality photograph of the captured front-lit photo, the background 215 can include a back drop of virtually any monochrome color and made of any material. The camera 210 is connected to a controller 240 which provides the synchronization of lights 220, 225, and 230, as well as the image capture by camera 210.

The controller 240 operates to initiate, in a predetermined sequence, the lights 220 and 225 and/or 230 and the shutter of the camera 210. The controller can be of a variety of types, including a digitally programmable device, a circuit responsive to a synchronization trigger output from the camera 210 to sequence the lights 220, 225, and 230, or a computer-operated controller.

The system 200 further includes a processor 260, which can be operatively connected to the controller 240, camera 210, and/or lights 220, 225, and 230. The processor 260 preferably includes a central processing unit 261 for running necessary application and system programs and a memory location 262. In addition, processor 260 is preferably arranged and configured to provide a memory storage device 263 for receiving and storing image data from camera 210. The memory storage device 263 may be an external hard drive connected with a USB type cable, a floppy disk drive, a CD or DVD writer or other well known memory storage device. The processor 260 may be a stand-alone device, wherein the image data from the camera 210 is provided via flash drive, memory stick, floppy disk, CD, DVD, or other well known data storage device. The processor 260 can be of a variety of types, including one or more computers, including special purpose computers or general-purpose computers such as personal computers (e.g., a Pentium chip based PC). The processor 260 is preferably programmed to implement at least parts of the image computing algorithms (described further below) in connection with the sequential acquired images. However, the processor 260 may merely record the sequential acquired images and transfer the images to a remote or other computer (best seen in FIG. 8).

While not specifically shown in FIG. 2, processor 260 may generally include various PC components and devices such as a video display unit, various memory devices (e.g., hard drives, CD-Drives, etc.), user input devices (e.g., a mouse and/or keypad), network connections for connecting to the internet and providing communications capability, and a modem.

The illumination units or lights 220, 225 and 230 are preferably flash units such as those sold under the designation AlienBees manufactured by AlienBees, a Division of Paul C. Buff, Inc. of Nashville Tenn. for the front light 220 and such as those sold under the designation Lumedyne manufactured by Lumedyne Inc. of Port Richey, Fla. for background light 225 and rear light 230. While not specifically shown in FIG. 2, it should be understood that a plurality of lights may be used rather than a single light—and that a single light for illuminating each of the foreground, background and translucent back drop is shown in FIG. 2 merely for convenience. While other types of lights and illumination devices may be used, an important selection criteria for the lights is the ability to backlight the foreground object in a manner which creates a silhouette and to light the foreground object in a manner which permits the capturing of an image of appropriate and/or desired quality.

The rear light 230 may optionally be used in connection with a translucent background 215. This type of lighting may provide more even lighting in the captured image and with fewer shadows, as well as the ability to locate the person 205 nearer the background screen 215. In a preferred embodiment only one of the lights 225 or 230 are generally used to capture the silhouette image. However, the lights 225 and 230 may be used together if desired.

The rear lighting may also be optionally generated using a back drop coated with a light emitting, glowing or other luminous layer 217. Such light can be obtained from a variety of luminescent materials. For example, chemiluminescence and bioluminescence can be used. These light sources involve the emission of light from chemical or biochemical reactions at ordinary temperatures. Such sources are described in more detail further below.

Figure 3:
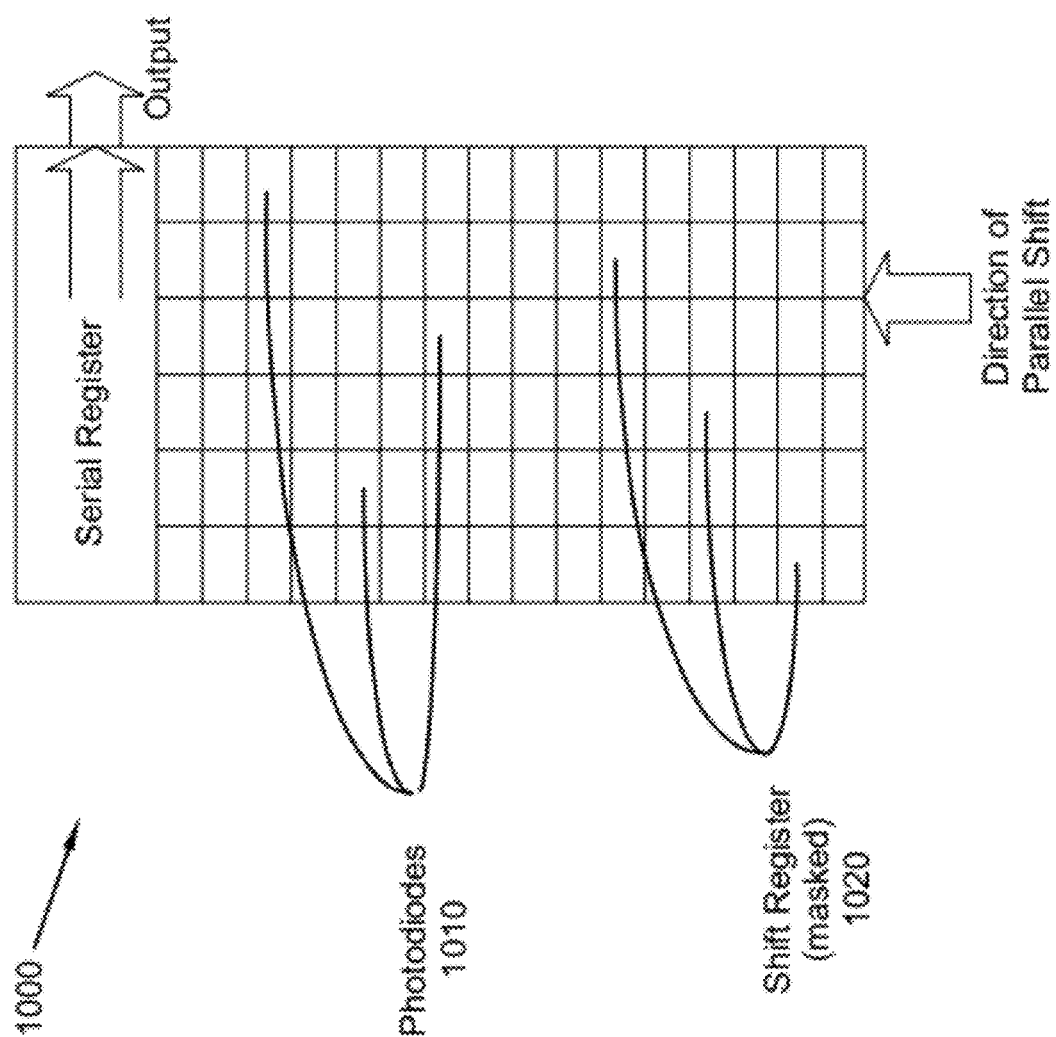
FIG. 3 schematically shows an interline-transfer CCD sensor used in a system according to one aspect of the present disclosure.

In the preferred embodiment, the camera 210 is comprised of three main sections: the lens 213, a mechanical shutter 212, and a CCD element 211. Generally, CCD elements have relatively rapid exposure speeds. However, the process of moving the captured image from the CCD element 211 to an image storage area is slower than the time to acquire the image. Accordingly, in order to reduce the time between acquiring the backlit and front-lit images—preferably to further reduce any motion of the foreground object in the time period between shots—the preferred CCD element 211 is an interline transfer CCD. Such elements are commercially available, and are manufactured by Eastman Kodak Company of Rochester, N.Y. under the designation KAI-11000. This type of CCD includes arrays of photodiodes interspaced with arrays of shift registers (best seen in FIG. 3 at 1000). In operation, after capturing a first image, the photodiodes 1010 transfer the electrons to the adjacent shift registers and become ready thereafter to capture the next image. Because of the close proximity between the photodiodes and associated shift registers, the imaging-transfer cycles can be very short. Thus, the preferred device can rapidly capture a first image, transfer the first image to a memory location (where it is temporarily stored) and then capture a second image. After the sequence of images, both of the images can be downloaded to the appropriate longer term memory location.

Since the CCD element 211 continues to integrate the second image while the first image is read out, a shutter 212 is employed in front of the CCD element 211. In the preferred embodiment, a mechanical shutter 212 is used and is synchronized by controller 240. The shutter 212 opens prior to the capture of the first image and remains open for the duration of the second flash. It then receives a signal to close in order to eliminate further exposure from ambient light. The preferred shutter 212 is commercially available, such as those manufactured by Redlake MASD LLC of Tucson, Ariz. However, other shutters may be employed. Further, the exposure may be controlled by the strobes, shutter, and/or a combination of the two.

Lens 213 is located in front of shutter 212 and is selected to provide the appropriate photographic characteristics of light transmission, depth of focus, etc. In the preferred embodiment, lens 213 is selected between 50 and 250 mm, with the image taken at an f-stop generally in the range of f16 to f22. This provides a zone focus for the image. It also generally eliminates concerns regarding ambient light. However, it will be appreciated that any number of lenses, focusing, and f-stops may be employed in connection with the present invention.

Camera 210 is arranged and configured to provide a single trigger pulse at the start of the integration of the first image. This pulse may be used by the controller to synchronize the lights 220, 225, and 230. In one embodiment, the front or rising edge can trigger the background lights 225 and/or 230, while the trailing or falling edge can trigger the front light 220. Other types of triggers and pulses may be used. For example, camera 210 might use two different pulses, etc.

To initiate the capture of the images, a shutter release (not shown) is preferably used. Such a release is generally connected to the camera. However, other methods and devices may be used to initiate the image capture. For example, the button, switch or other device might be included on the controller 240. Still further, the computer 260 could be used to initiate the process.

Figure 4:
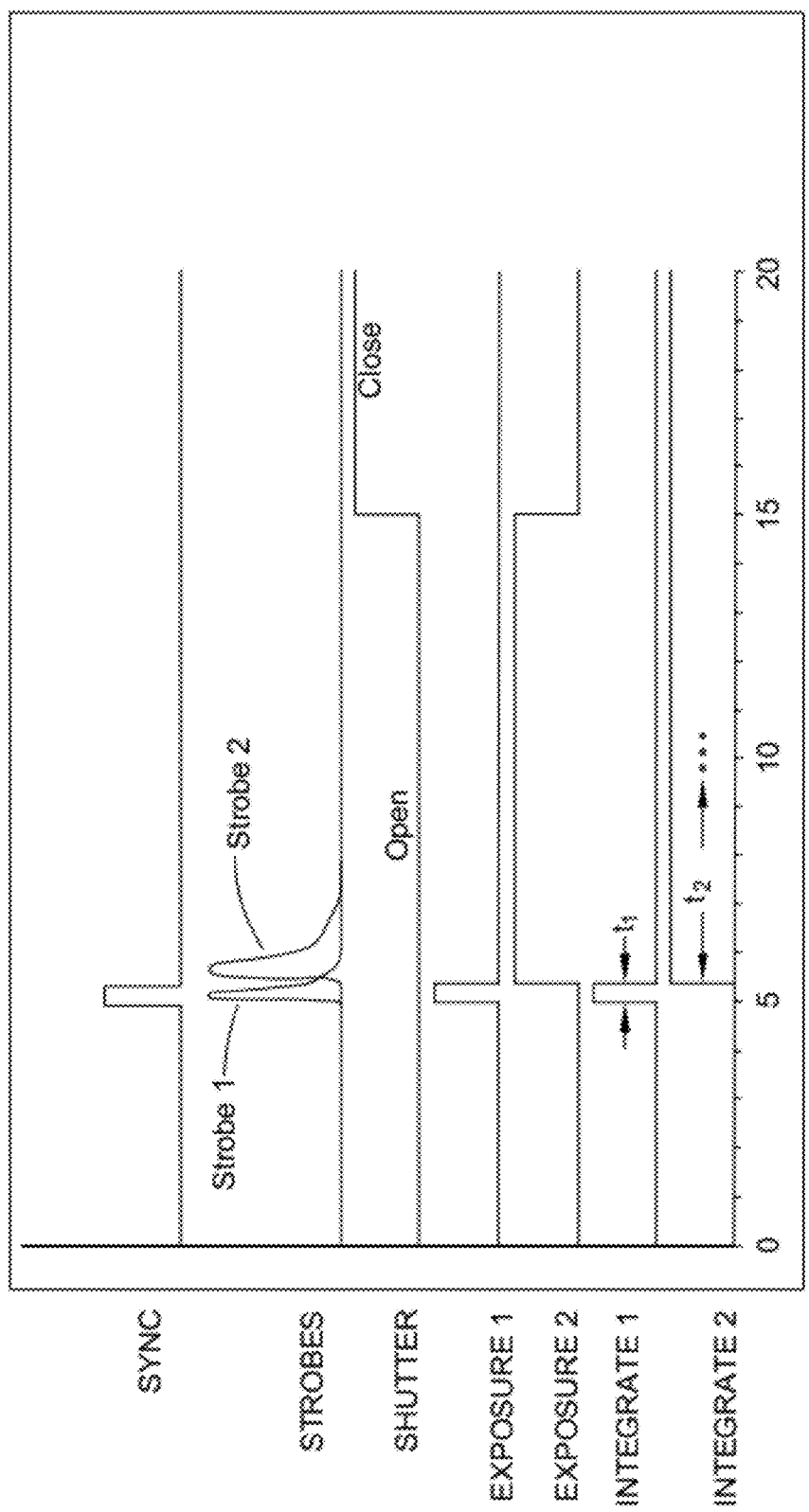
FIG. 4 diagrammatically illustrates the timing of the image capture by the camera 210 relative to the illumination from the light sources and the camera 210 integration.

FIG. 4 illustrates the preferred timing for the actuation of the various devices of system 200. As previously discussed, the strobe lights are the pacing items for the acquisition of the two sequential images due to the decay of the light from the strobes. Certain types of lights may be employed to narrow the time period. In a preferred embodiment, the sync pulse is generated by camera 210. The controller 240 synchronizes the strobes, wherein strobe 1 correlates with the activation of background light 225 and strobe 2 correlates with the activation of front light 220. As noted above, rear light 230 may be optionally employed with a translucent background 215 either in combination with background light 225 or by itself.

The timing of the activation of strobe 2 and the capture of the second image (designated Exposure 2 in FIG. 4) is preferably selected so that the decay of the background light 225 reaches a desired point for acquiring the image of the foreground object. Therefore, a single activation of the background strobe may be employed for both of the captured images. Exposure 2 is started electronically by the camera 210, but is finished by the shutting of the mechanical shutter 212. As shown in FIG. 4, it takes approximately 10 milliseconds to close the shutter—with most of the time lag being due to getting enough current in the solenoid when driven with a constant voltage. However, such time period may vary using other types and styles of shutters and drive circuits.

The Integration 1 and Integration 2 time periods (abbreviated Integrate in FIG. 4) are those periods in which the light energy falling on the CCD element 211 are converted to an electronic light intensity. Therefore, the time period $t_1$ generally corresponds to the Exposure 1 and time period $t_2$ generally corresponds to the Exposure 2. In the latter case, the Integration 2 continues after the mechanical shutter 212 closes, but since the closed shutter blocks all further incident light, the Exposure 2 is not affected. There is a very short delay between the end of the Exposure 1 and the start of the Exposure 2 which is due to moving the collected image information in the preferred CCD element 211 to its on-board memory location proximate the photodiode collectors.

Alternative cameras and other image acquisition devices may be employed to practice the principles of the present invention. For example, FIGS. 5a-5c illustrate three different embodiments which may be utilized to acquire the sequential images.

Figure 5A:
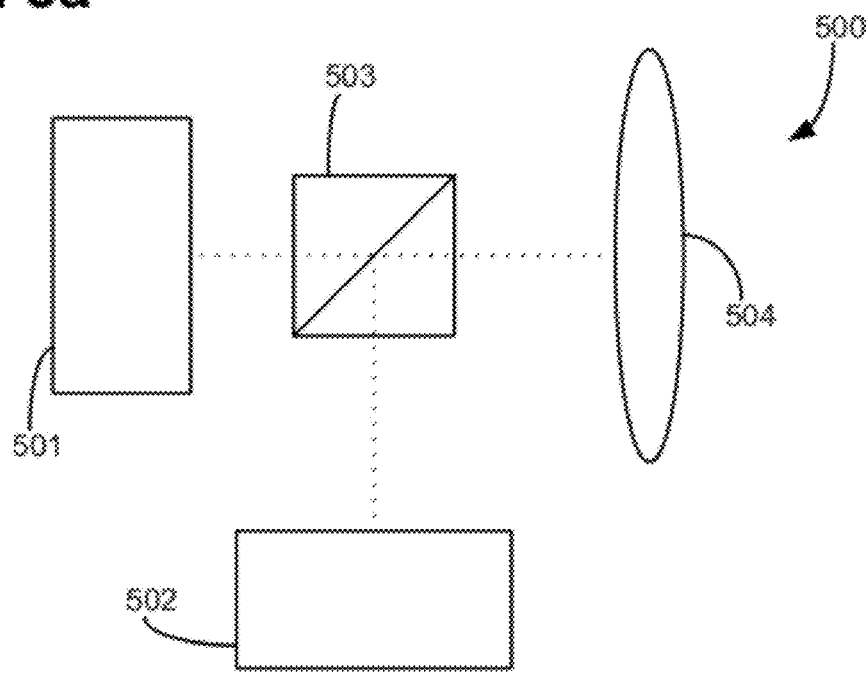
FIG. 5a is a first alternative embodiment to camera 210 in which two digital image sensors with electronic shutters are employed, and wherein a device for sending the same image to the two sensors is employed.

In FIG. 5a the alternative embodiment is shown generally at 500. Two CCD devices or other digital image sensors 501, 502 are utilized. Each of the digital image sensors include integral electronic shutters (not shown). A beam splitter 503 is used to provide the same image from lens 504 to the digital image sensors 501, 502. In this embodiment, the first and second images may be captured by sensors 501 and 502, respectively.

Figure 5B:
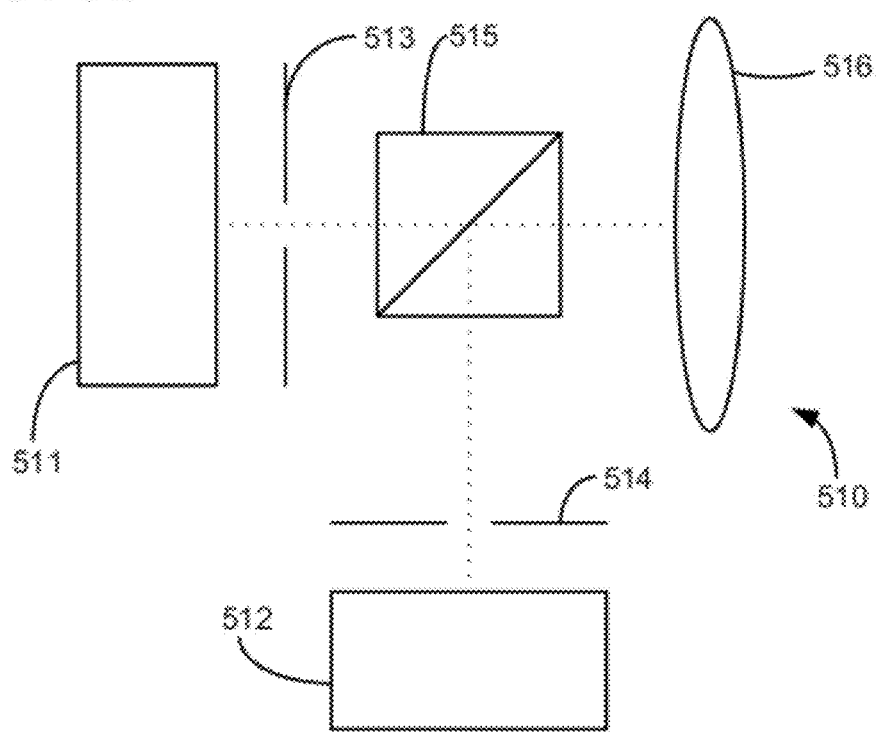
FIG. 5b is a second alternative embodiment to camera 210 in which two digital image sensors are employed with mechanical shutters, and wherein a device for sending the same image to the two sensors is employed.

A second alternative embodiment is shown in FIG. 5b at 510. Two CCD devices or other digital image sensors 511, 512 are utilized. However, each of the sensors 511, 502 in this embodiment are used in connection with mechanical shutters 513, 514 respectively. A beam splitter 515 is used to provide the same image from lens 516 to the digital image sensors 511, 512. In this embodiment, the first and second images are captured by sensors 511 and 512, respectively.

A third alternative embodiment is shown in FIG. 5c generally at 520. Two CCD devices or other digital imaging sensors 521, 522 are utilized. Each of the sensors 521, 522 are used in connection with a mechanical shutter 523, 524 respectively. Also, an individual lens 525, 526 is provided with each sensor. A beam splitter 527 provides the image to each of the sensors 521 and 522 via lenses 525 and 526. In this embodiment, the sequential images are captured by sensors 521 and 522. Preferably, the related sensor 521, shutter 523, and lens 525 (and sensor 522, shutter 524, and lens 526) may be combined in an integral manner—essentially providing two cameras taking a picture of the same image with a beam splitter. However, discrete components may also be employed.

In each of the three alternative embodiments, other devices may be employed in lieu of beam splitter 503, 515, and 527 to provide the desired functionality. For example, prisms, beam splitter cubes, mirrors with holes, and other devices which send the same image to two physical locations may be used. Further, while additional optical devices and sensors are required in the three alternative embodiments, the embodiments may have advantages in speed and downloading of the image from the sensors. However, the lights may still be the pacing item for the necessary time for the acquired images.

Figure 6:
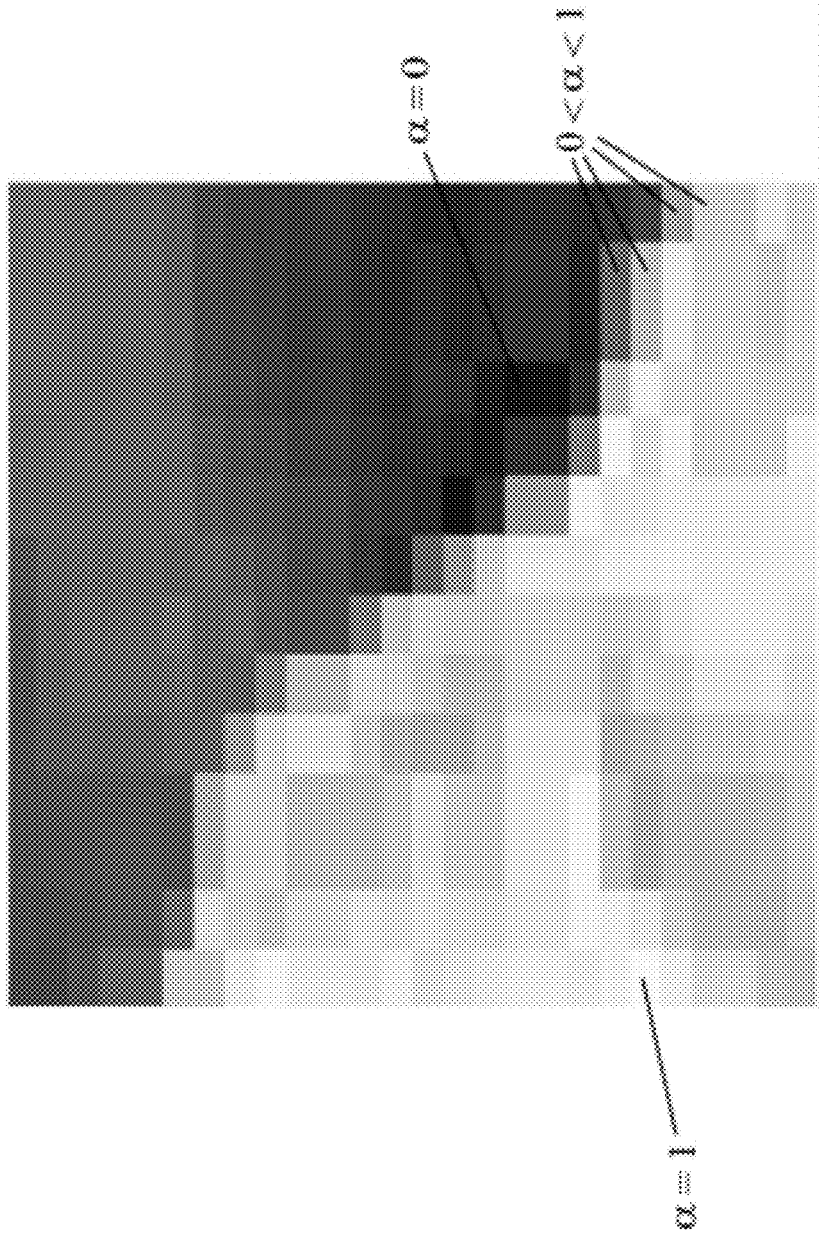
FIG. 6 schematically shows an enlarged portion of the image in FIG. 1c in a region around a segment of an edge between the foreground object and background in which the transition between light and dark pixels is shown.

Turning now to FIG. 6, a representative area of the boundary between the removed background and the mask portions of FIG. 1c is schematically shown. The boundary is shown generally at 600. In order to satisfactorily separate the foreground and background portions, it is necessary to consider the details of the boundary between the two portions. Due to the resolution of the optics and number of pixels of the CCD device 211, there is not a sharp line of demarcation between the background 22 and the silhouette 21. Instead, as shown in FIG. 6, there is a blurring over a number of pixels. More specifically, there is a transition from $\alpha=1$ in the silhouette or mask area, proceeding through a range of pixels where $0<\alpha.<1$ in the blurred area, and reaching the background area where $\alpha=0$. Thus, in this border region, the pixels include contributions from both the foreground and background portions. The present invention takes the fractional contributions from both foreground and background into account when removing the original background and combining new backgrounds.

In order to remove the original background, a mixing function is used, which in the preferred embodiment uses the alpha channel, which comprises an alpha value ($\alpha$) for each pixel. First, an estimate of the backlit background $B_g^{bl}$ at each point in the image is made. Then, for each point in the image, using the brightest color channel (i.e., the blue channel if a blue background is used or the green channel if a green or gray background is used), $\beta$ is calculated as follows:

$$\beta = M_g / B_g^{bl} \tag{1}$$

where $\beta$ is the ratio of background to foreground $M_g$ is the measured pixel level $B_g^{bl}$ is the estimated background pixel level Next, $\alpha$ is calculated as follows:

$$\alpha = 1 - (\beta - \beta_l)/(\beta_h - \beta_l) \text{ if } \beta_l \leq \beta \leq \beta_h$$

$$\alpha = 1 \text{ if } \beta < \beta_l$$

$$\alpha = 0 \text{ if } \beta > \beta_h \tag{2}$$

where $\alpha$ is the mixing factor $\beta_l$ is low $\beta$ threshold, below which $\alpha=1$ $\beta_h$ is high $\beta$ threshold, above which $\alpha=0$ In the preferred embodiment, $\beta_l$ is set such that in the known foreground $\alpha=1$ with the observed noise and ambient light contamination. $\beta_h$ is set such that in the known background $\alpha=0$ with the observed image noise.

A variety of estimation methods can be used. For example, it may be possible to create a uniform background. In such cases $B_g^{bl}$ is the same for every pixel. For non-uniform background, surface fitting techniques may be used.

As discussed above in connection with FIG. 6, in border regions between the foreground and background portions of an image, $\alpha$ takes on values between 0 and 1. Thus, $\alpha$ undergoes a transition between 0 and 1, reflecting the partial contributions of the intensity level in the pixels in the border regions. The resulting alpha channel results of the image comprise the mask which is used as described below to remove the original background from the image in which the foreground object is well-lit.

To remove the background, an object image function is computed. The object image function in this example is $\alpha F^c$ and is computed by the formula $$\alpha F^c = M - (1-\alpha) B^{fl} \quad (3)$$

where $F^c$ is the corrected foreground pixel (i.e., without any background mixed in), M is the measured foreground image pixel, $B^{fl}$ is the estimated front lit background pixel.

As with the backlit image, the background here is estimated, typically from the light intensities deep with background image portion 22. For cases where the background is sufficiently uniform, $B^{fl}$ is a constant for all pixels; for a non-uniform background, well-known techniques can be used to model the background. Note that this formula is a rearrangement of the formula for conventional alpha blending, according to which $$R = \alpha F + (1-\alpha) B \quad (4)$$

where R, F, and B are color vectors with red, green and blue components, $\alpha$ is the mixing factor, F is the foreground pixel, B is the background pixel, and R is the pixel resulting from alpha blending of the foreground and background pixels.

Because $\alpha$ is known and $\alpha F^c$ is known, $F^c$ can be computed. Alternatively, as shown below, because $\alpha F^c$, instead of $F^c$ itself, is used for subsequent compositing with new background images, $\alpha$ and either $F^c$ or $\alpha F^c$ can be stored or transmitted to the desired destinations (e.g., over computer networks such as the Internet) for later use in compositing with new background images.

The object image function, $\alpha F^c$, and a new background image are combined to generate an image with the foreground image $F^c$ in a new background. To generate the new image, the standard alpha blending is again used:

$$R = \alpha F^c + (1-\alpha) B^{new} \quad (5)$$

where R is the resulting pixel, and $B^{new}$ is the new background pixel.

In the new image, $\alpha$ is approximately 1 in the areas in registration with the image of the foreground object 21, and those areas are therefore occupied by the image of the foreground object 21. In contrast, $\alpha$ is approximately 0 in the areas outside image of the foreground object 21. Therefore, those areas are occupied by the new background image. In the border regions between the foreground and background images, $\alpha$ is between approximately 0 and approximately 1. In intensity level of each pixel in the border regions is thus a sum of the contributions from both the foreground image and background image. The foreground object 21 therefore appears to be placed in front of the new background in the composite image, with properly blended edges between the two image portions. As a result, the foreground object appears naturally in front of the background.

Example Applications

One feature of the present invention is that the image of the foreground object can be positioned anywhere, and in any orientation, relative to the new background in a composite image. For example, the foreground object image can be positioned by padding values of 1 for $\alpha$ and values of (0, 0, 0) for $F^c$ or $\alpha F^c$ for the appropriate pixels. Thus, for example, a foreground object image taken in a portrait (i.e., vertical) format can be used to position the image of the object in a new background with a landscape (i.e., horizontal) format.

Another feature is that once a backlit image and front-lit image are captured and processed as described herein, only $\alpha$ and $\alpha F^c$ (or $F^c$) values need to be stored for later use. The stored information can be later retrieved to combine with new background images to generate composite images. The $\alpha$ and $\alpha F^c$ information can also be transmitted over computer networks to be used at destination sites. By transmitting only this information, speed and bandwidth may be significantly improved. More specifically, if the new backgrounds are comprised of a large number of pixels, then the background may be stored at the destination site, and only the foreground object needs to be transmitted.

Figure 8:
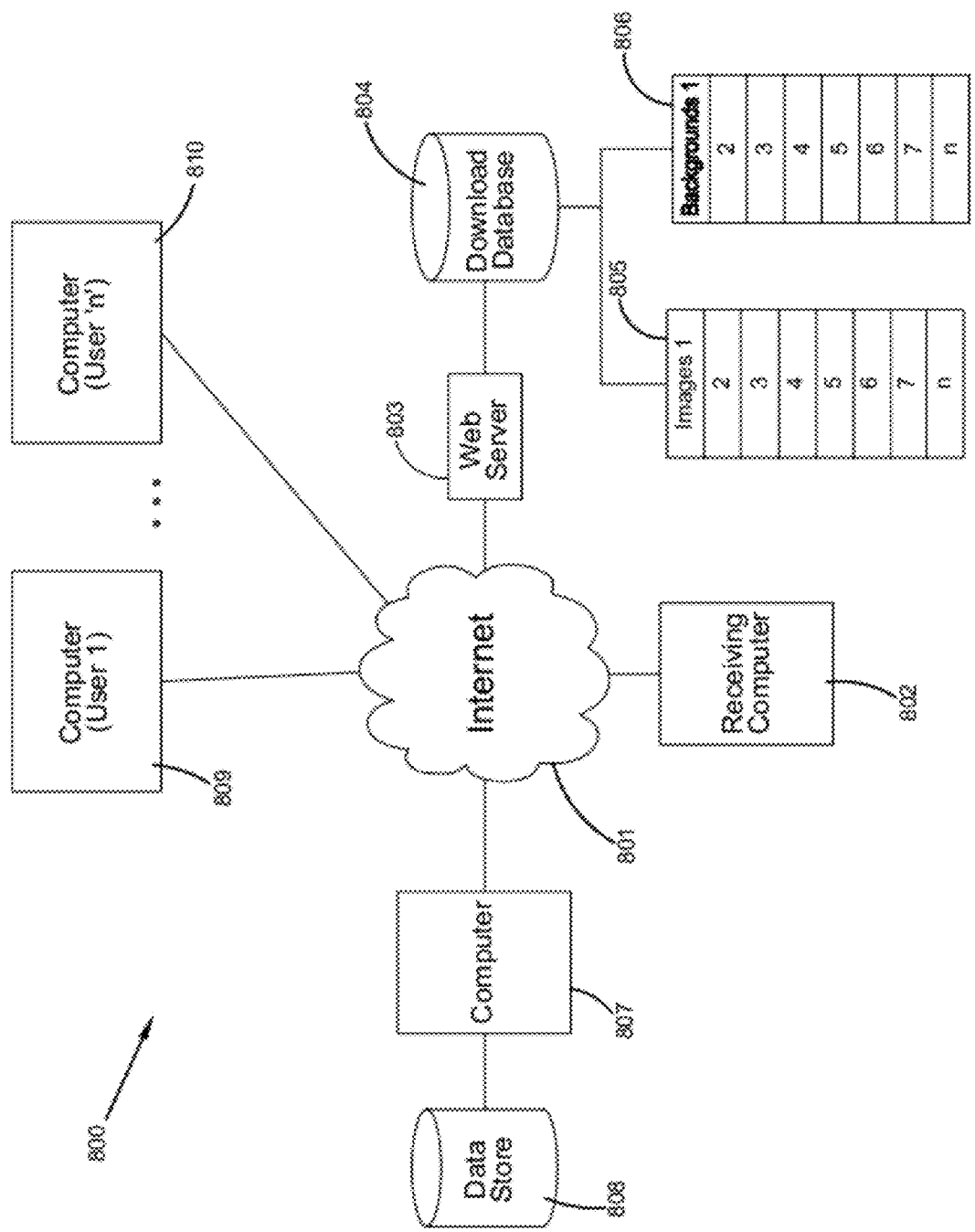
FIG. 8 schematically illustrates a larger distributed system 800 in which images captured by the system 200 of FIG. 2 may be processed, downloaded, and stored, among other further uses.

By way of example, and with reference to FIG. 8, various components of a larger, distributed system are shown at 800. In this larger, distributed system 800, the images captured by individual systems 200 and stored in memory storage devices 263 may be provided to a centralized database 804 for processing, storage, further distribution and/or other uses. Data store 808 comprises the memory storage device 263 and provides for the captured images to be transmitted by computer 807, via internet 801 and web server 803, to the centralized database 804. Since a number of systems 200 may be employed to capture a large number of images, a plurality of data stores 808 may be used. Further, any number of individual memory storage devices 263 may be represented by data store 808.

Although internet 801 is illustrated as a preferred communication medium, other communication systems may be employed including directly connecting memory storage devices 263 to the database 804 via LAN or WAN, proprietary communication connections, dial-up modems over PBX networks, etc.

In this system, the stored $\alpha$ and $\alpha F^c$ information can be transmitted from either the computer 807 or the web server 803 to the receiving computer 802. Various backgrounds may then be inserted into the image by the receiving computer 802 having that information.

Yet another feature is providing images over on-line services. Still referring to FIG. 8, here a customer at a remote site 809 can be shown an image of the foreground object and be allowed to choose one or more backgrounds from a predetermined set of background images to be combined with the foreground object image. In this case, the remote user 809 may view the appropriate images 805 and backgrounds 806 stored in the database 804 via the internet 801. Once the customer has selected the background or backgrounds and placed the order, then the foreground object image ($F^c$ or $\alpha F^c$) can be transmitted to the appropriate printing facility to be combined with the customer-selected background or backgrounds. In this example, the receiving computer 802 may be located at the printing facility.

As noted above, the set of backgrounds can be pre-stored at the printing facility, and the customer-selected backgrounds need not be transmitted with every order, thereby reducing the transmission overhead of the network. Any number of images 805 and backgrounds 806 may be stored in the database 804, with images 1-$n$ and backgrounds 1-$n$ shown by way of illustration. The number of users 809, 810 may be comprised of virtually any number of users 1-$n$. The users may be prompted to enter passwords or other information to view the appropriate stored images 805 and backgrounds 806. The users may also view hard copies of images and/or be physically present at a physical location while viewing the images and backgrounds, rather than logging on to a site and viewing the images over internet.

As described above, another application is the use of a single image of a foreground object with a variety of backgrounds for a variety of purposes. For example, in a school or university setting, a portrait of a student can be taken with the process disclosed above, and the image of the student without the background can be stored. The stored image can later be used with appropriate backgrounds for a variety of applications, including photo identification cards, yearbooks, announcements, campus news paper photos and student's personal web pages. Efficient use of organizational resources is thereby achieved.

A further feature of the present invention is the use of a backlit translucent background. By using this arrangement, the subject may be placed closer to the background. As shown in FIG. 2, a full length shot may be taken of the foreground object 205. A short stage 216 or other suitable flooring can be placed under the object and extend to the background 215 to enable full length shots. Other creative images may be captured by utilizing the present invention with a translucent floor. In this case the flash is located below the floor and the camera looks down on the object on the floor.

According to another feature of the present disclosure, the time interval between the captured images may be adjusted to compensate for the anticipated movement of the foreground object. By selecting the appropriate interval, the mask and foreground object image will be adequately registered with one another. For example, to capture images of a dancer in motion, it may be anticipated that the speed of the motion to be tolerated is much greater than for a still photo. As another example, if an image is captured at a high resolution, but only needs to be displayed as a lower resolution, a misalignment of more pixels may be more acceptable than if the image is to be displayed at a high resolution.

For a given amount of tolerance of mis-registration, the relationship between the tolerable speed of motion and the time interval between the sequentially captured images is essentially hyperbolic, governed by the equation $$v_t = w_s d_t / (w_c t) \quad (6)$$

where $v_t$ is the tolerated velocity at the subject,
$w_s$ is the width of the image at the subject,
$d_t$ is the distance (in pixels) in the camera, that can be tolerated,
$w_c$ is the width (in pixels) of the image in the camera,
t is the time to capture both images.

Figure 7A:
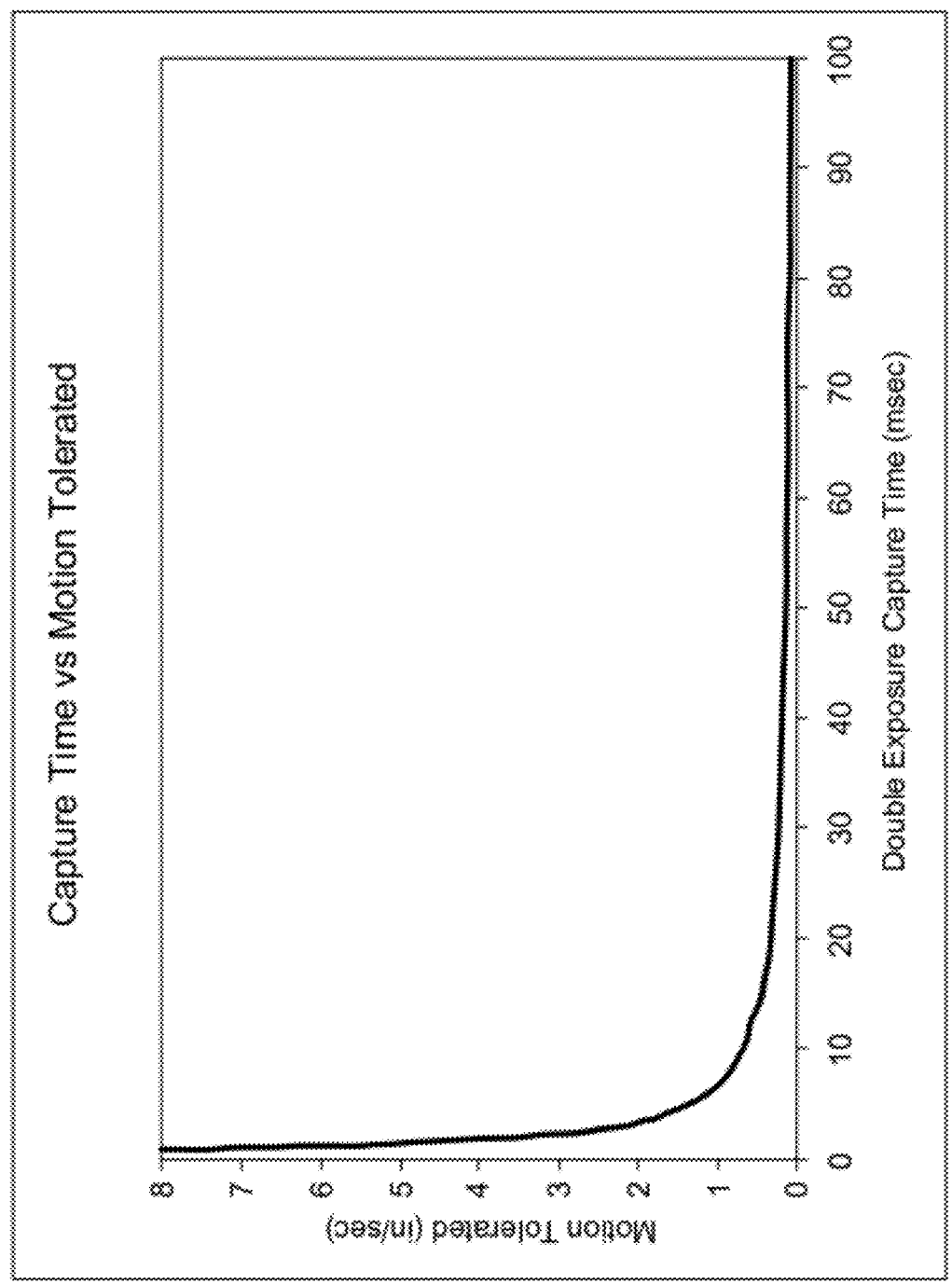
FIGS. 7(a) and 7(b) show, in different scales, a curve representing the relationship between the maximum tolerable speed of motion of the foreground object and the maximum lapsed time allowed between capturing the silhouette image and front-lit image according an aspect of the present disclosure.
Figure 7B:
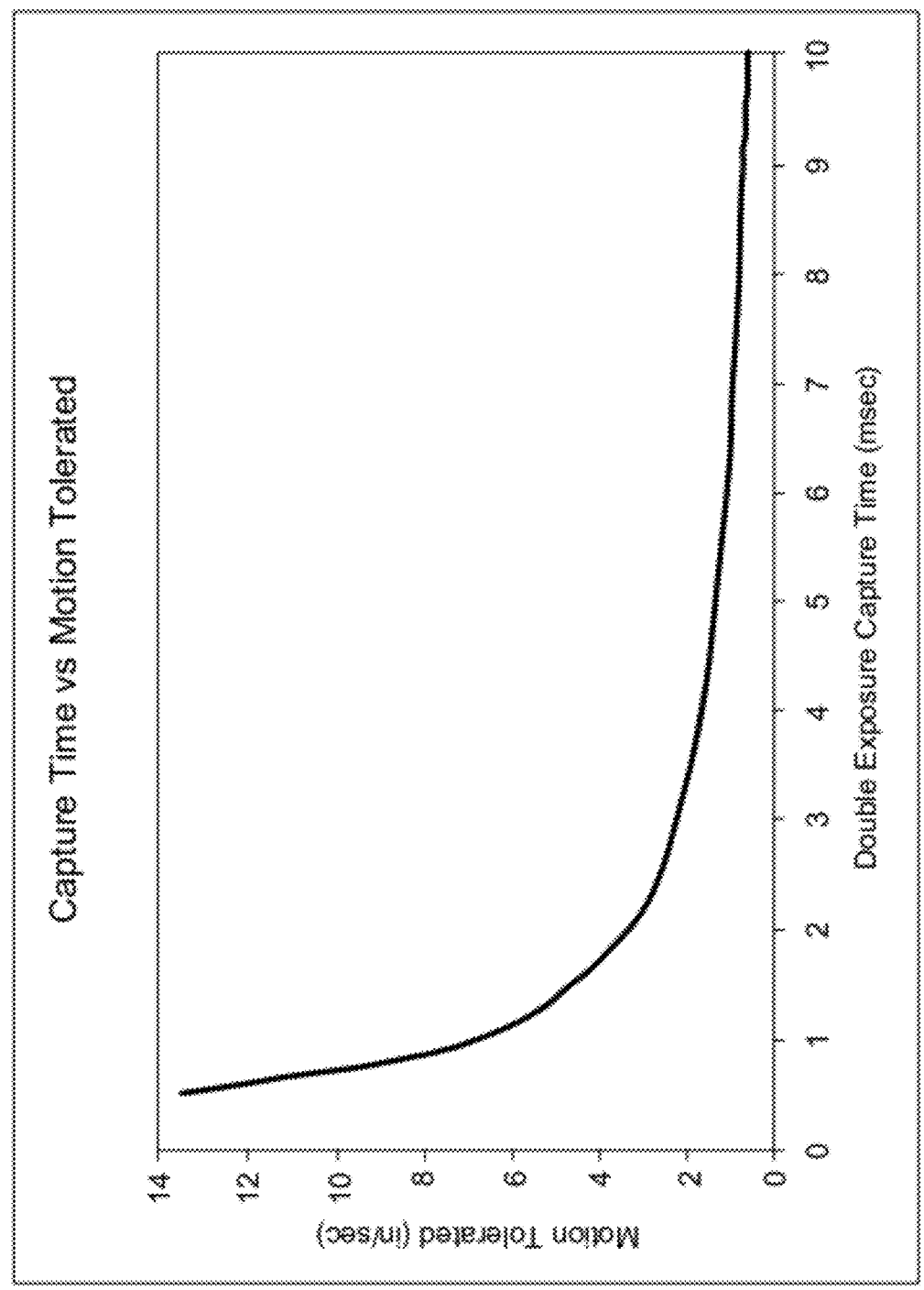

Thus, for example, for $w_s=36$ inches, $d_t=0.5$ pixels and $w_c=2672$, the tolerable speed of movement, $v_t$, is a hyperbolic function of the image capture time t, as shown in FIGS. 7(a) and 7(b). As a more specific example, for a tolerance of mis-registration of a fraction of pixels (e.g., 0.5 pixels) and a speed of movement of a few inches per second, the backlit and front-lit images must be taken with a few milliseconds from each other. For such applications, camera systems with capability for capturing images in rapid successions, as discussed above, can be used.

Yet another feature is the additional accuracy of face finding after the elimination of the background. Resizing heads to a uniform size for yearbooks and the like, sharpening and processing of images, and dropping subjects into multiple layered photos are all additional features which may be accomplished in connection with the present invention.

Luminescent Materials

It is believed that luminescence may be used as the layer 217 on background 215 to generate the backlighting in certain conditions. Luminescence is the process of producing light in excess of thermal radiation following an excitation. A solid material exhibiting luminescence is called a phosphor. Phosphors are usually fine inorganic compound powders of a high degree of purity and a median particle size of 3-15 micrometers, but may be large single crystals, used as scintillators, or glasses or thin films. Phosphors may be excited by high energy invisible uv radiation (photoluminescence), x-rays (radioluminescence), high energy electrons (cathodoluminescence), a strong electric field (electroluminescence), or in some cases infrared radiation (up-conversion), chemical reactions (chemiluminescence), or even stress (triboluminescence). Phosphors usually contain activator ions in addition to the host material. These ions are deliberately added in the proper proportion during the synthesis. The activators and their surround ions form the active optical centers. The optical properties of a phosphor are measured on relatively thick plaques of the phosphor powder. An important optical property for the application of the phosphor is its emission spectrum, the variation in the intensity of the emitted light versus wavelength.

Electroluminescence methods are particularly suited to the task of generating rapid pulses of light. This type of luminescence involves a phosphor which generates light directly when an applied electric field is applied. When impressed across a phosphor the source is most desirable for flat panel displays. There are two ways this can be done with present materials. The first is to use a light-emitting diode (LED). These are single crystal usually of GaP doped with trace amounts of nitrogen. The second way to directly convert electric energy into light is with an electroluminescent phosphor. By far the best electroluminescent phosphor is ZnS:$Mn^{2+}$.

Other methods of luminescence may be used to produce a strobe light in layer 217, provided that they are fast and bright enough for the current application. In addition, other technologies to provide a strobe light in layer 217 may be used including arrays of smaller slash units or light-emitting diodes (LEDs).

While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefore other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

We claim:

1. An imaging system for photographing a subject, the system comprising:
    a foreground light source arranged and configured to illuminate the subject;
    a background light source arranged and configured to illuminate a background;
    a digital camera configured to capture still photographs of a subject arranged between the digital camera and the background; and
    a controller configured to:
        synchronize illumination of the background light source with a capture of a background illuminated image taken by the digital camera; and
        synchronize illumination of the foreground light source with a capture of a foreground illuminated image taken by the digital camera.

2. The imaging system of claim 1, wherein the controller is arranged and configured to capture the foreground illuminated image before complete decay of light from the illumination of the background light source.

3. The imaging system of claim 1, wherein the digital camera is arranged and configured to capture color photographs.

4. The imaging system of claim 1, wherein the digital camera is arranged and configured to detect visible light from the foreground light source and the background light source, and wherein the foreground light source and the background light source are positioned to provide visible light to the digital camera.

5. The imaging system of claim 1, wherein the digital camera comprises a lens, a mechanical shutter, and a charge-coupled device.

6. The imaging system of claim 5, wherein the mechanical shutter is synchronized to close after illumination of the foreground light source and during the digital camera's capture of the foreground illuminated image.

7. The imaging system of claim 5, wherein the charge-coupled device is an interline-transfer charge-coupled device.

8. The imaging system of claim 7, wherein the interline-transfer charge-coupled device includes photodiodes and shift registers, wherein the photodiodes are configured to transfer electrons associated with the background illuminated image to the shift registers prior to capturing the foreground illuminated image using the photodiodes.

9. The imaging system of claim 1, further comprising a memory storage device, wherein the memory storage device stores the background illuminated image and the foreground illuminated image.

10. A method of photographing a subject arranged in front of a background, the method comprising:
synchronizing a flash of a background light source to occur while capturing a background illuminated image with a digital camera, the digital camera configured to capture still photographs, and the background light source positioned to illuminate the background; and
synchronizing a flash of a foreground light source to occur while capturing a foreground illuminated image with the digital camera.

11. The method of claim 10, wherein the flash of the foreground light source is timed to occur before complete decay of the flash of the background light source.

12. The method of claim 10, wherein the background illuminated image and the foreground illuminated image are color images.

13. The method of claim 10, further comprising timing the flash of the foreground light source to occur within a time interval of the flash of the background light source, wherein the time interval is computed according to the formula:

$$t = w_s d_t / (w_c v_t)$$

where $v_t$ is a tolerated speed of a foreground object,
$w_s$ is a width of the foreground illuminated image at the foreground object,
$d_t$ is the number of pixels by which the background illuminated and the foreground illuminated images are permitted to be offset from each other,
$w_c$ is the width (in pixels) of the background illuminated and the foreground illuminated images, and
t is the time to capture both of the background illuminated and the foreground illuminated images.

14. The method of claim 10, further comprising timing the flash of the foreground light source to occur within a time interval of the flash of the background light source, wherein the time interval is computed based on a number of pixels by which the background illuminated and the foreground illuminated images are permitted to be offset from each other, wherein the offset is less than a fraction of a pixel.

15. The method of claim 10, wherein the digital camera comprises a lens, a mechanical shutter, and a charge-coupled device, and further comprising closing the mechanical shutter during the capturing of the foreground illuminated image with the digital camera.

16. An imaging system for photographing a subject, the system comprising:
a background;
a foreground light source arranged and configured to illuminate the subject;
a background light source arranged and configured to illuminate the background;
a digital camera configured to capture still photographs of a subject arranged between the digital camera and the background; and
a controller configured to:
synchronize illumination of the foreground light source with a capture of a foreground illuminated image with the digital camera; and
synchronize illumination of the background light source with a capture of a background illuminated image with the digital camera.

17. The imaging system of claim 16, wherein the controller generates a single trigger pulse, wherein a rising edge of the single trigger pulse triggers the illumination of the background light source and a falling edge of the single trigger pulse triggers the illumination of the foreground illuminated image.

18. The imaging system of claim 16, wherein the foreground light source and the background light source are flash light sources that generate visible light.

19. The imaging system of claim 16, wherein the foreground illuminated image and the background illuminated image are color images.

20. The imaging system of claim 16, wherein the digital camera outputs the foreground illuminated image and the background illuminated image as digital image files.

* * * * *